(No Model.)
H. A. TRUITT.
MACHINE FOR KNITTING FABRICS HAVING A PLUSH SURFACE.
No. 263,999. Patented Sept. 5, 1882.
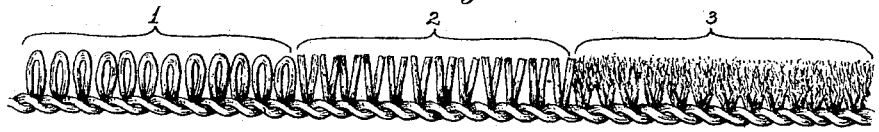
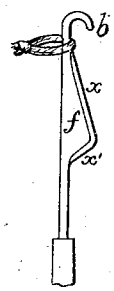
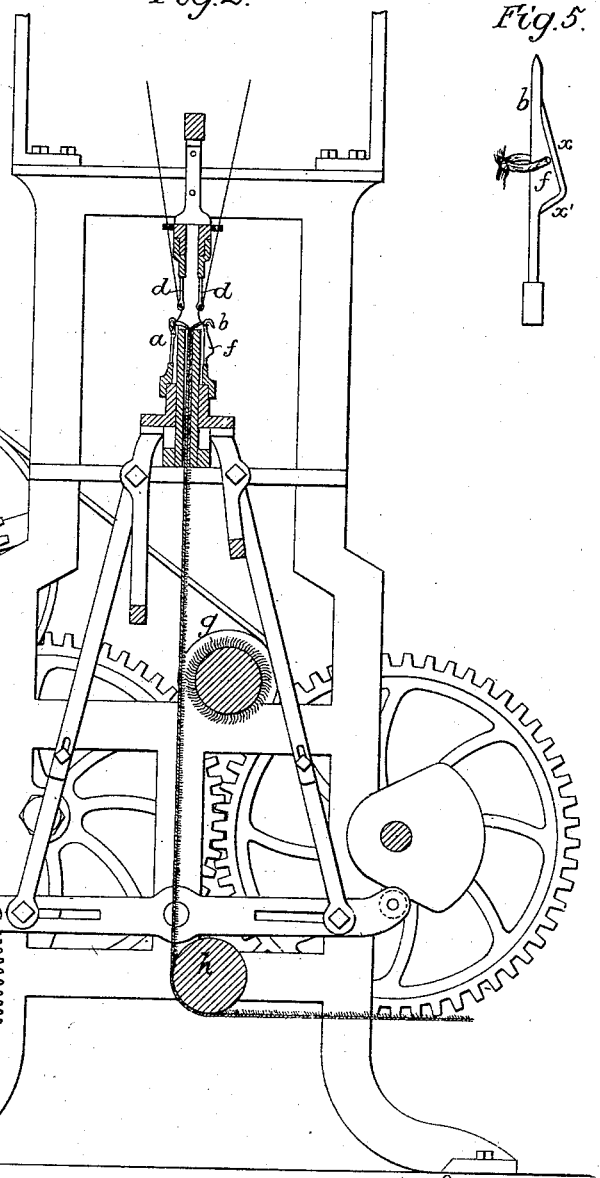

UNITED STATES PATENT OFFICE.

HENRY A. TRUITT, OF PHILADELPHIA, PENNSYLVANIA.

MACHINE FOR KNITTING FABRICS HAVING A PLUSH SURFACE.

SPECIFICATION forming part of Letters Patent No. 263,999, dated September 5, 1882.

Application filed May 25, 1882. (No model.)

*To all whom it may concern:*

Be it known that I, HENRY A. TRUITT, a citizen of the United States, and a resident of Philadelphia, Pennsylvania, have invented certain Improvements in Machines for Knitting Fabrics having a Plush Surface, of which the following is a specification.

My invention relates to certain improvements in machines for knitting fabrics having a cut plush surface, my improvements relating to the devices employed for cutting the loops.

In the accompanying drawings, Figure 1 is a diagram illustrating the successive steps in the manufacture of the fabric; Fig. 2, a transverse section of a knitting-machine adapted for the production of the fabric; and Figs. 3 to 6, inclusive, detached views showing different forms of cutting-blades which can be used in carrying out my invention.

The fabric has a plain knitted background or body consisting of interlocked courses of stitches. The cut plush surface is produced by forming the fabric with projecting loops, such as shown at 1, Fig. 1, these loops being then cut, as shown at 2, Fig. 1, and the cut ends of the loops being finally frayed or fulled, as shown at 3, Fig. 1.

Fabric such as shown at 1, Fig. 1, has been heretofore produced by the joint action of needles *a*, loop-retaining hooks *b*, and thread-guides *d* of a double-rib knitting-machine such as shown in Fig. 2. Hence these devices form no part of my invention, except as contributing to the manufacture of the fabric, the main feature of my invention consisting in the combination, with the loop-retaining hooks *b*, of blades for cutting the loops held thereby.

I combine an inclined cutting-blade, *f*, directly with each loop-retaining hook, as shown in Figs. 3 and 4, so that as the hook rises to receive a fresh loop of thread from one of the guides *d* the loop which is already on the hook will be severed, as shown in Fig. 4. The edge of the cutting-blade is preferably inclined in both directions, so as to form two cutting-edges, *x x'*, the former acting on the loop as the hook rises, and the edge *x'* acting as the hook descends in case the loop has not been severed by the edge *x* on the ascent of the hook.

Instead of a hook, a loop-retaining pin such as shown in Fig. 5 may be employed, the cutting-blade *f* being combined therewith in the same way as with the hook; or, in place of a hook or pin, a latch-needle such as shown in Fig. 6 may be used, the rear edge of the latch being sharpened, so as to act as a cutting-blade and sever the loop as it slips over the same.

After the fabric is produced it passes down through the machine and under a roller, *h*; but before reaching said roller the surface of the fabric is acted upon by the teeth of a drum, *g*, the effect of which is to fray or separate the fibers of the cut ends of the yarn forming the severed loops. This portion of the machine, however, forms no part of my invention, nor is the invention limited thereto, as any desired mechanism may be employed for this purpose.

By varying the knitting mechanism any required patterns may be produced, and, if desired, a portion only of the loop-retaining hooks may be combined with cutting-blades, so that the plush may alternate with portions of a different character.

I am aware that it has hitherto been proposed to make cut plush fabrics by the employment of rotary cutters in connection with recessed loop-catching pins, and I therefore do not claim broadly the combination of loop catchers and cutters, my invention being designed to obviate the objections to the use of cutters independent of the pins or hooks.

I claim as my invention—

1. The within-described loop retaining hook or pin, having a cutting-blade, *f*, secured to or forming part thereof, as set forth.

2. The loop-retaining hook or pin, having a blade, *f*, forming part thereof, and having opposite cutting-faces, *x x'*, as set forth.

3. The combination of the needles *a* and guides *d* of the knitting-machine with the loop-retainers *b*, having knives *f* secured to or forming part thereof, as set forth.

In testimony whereof I have signed my name to this specification in the presence of two subscribing witnesses.

HENRY A. TRUITT.

Witnesses:
 HARRY DRURY,
 HARRY SMITH.